Aug. 10, 1943.    W. A. OWEN    2,326,488
RESILIENT TIRE FOR VEHICLES
Filed Jan. 6, 1943    2 Sheets-Sheet 1
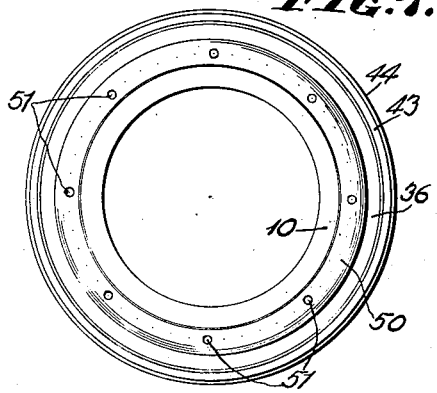
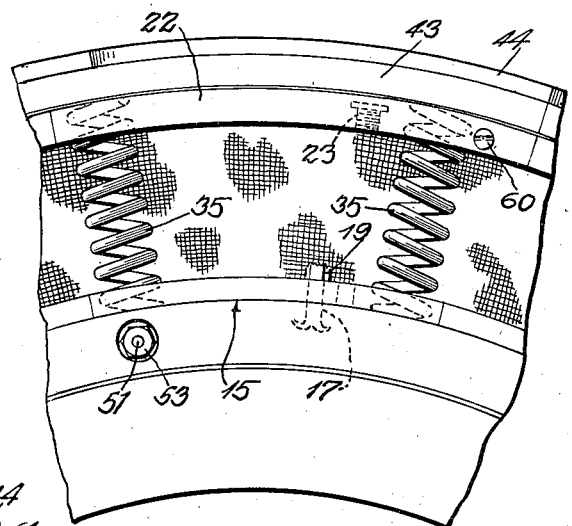
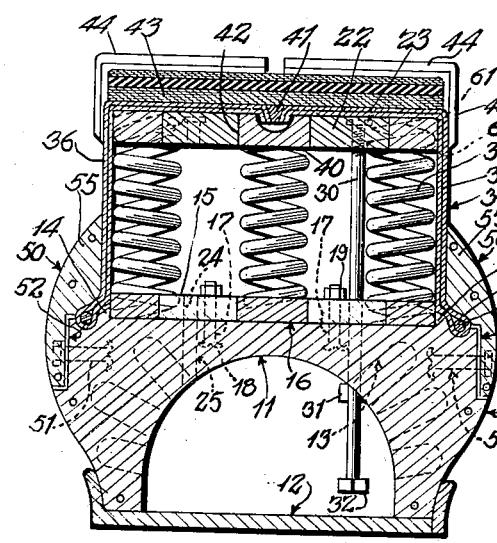
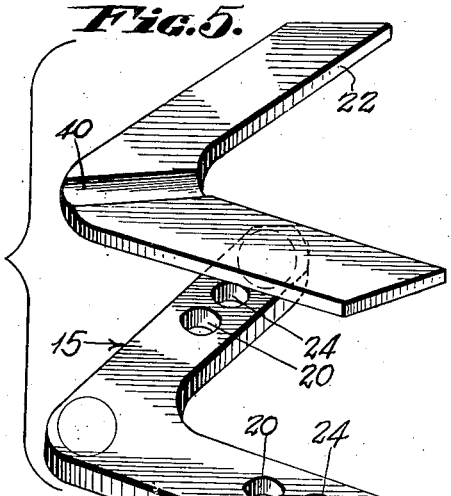
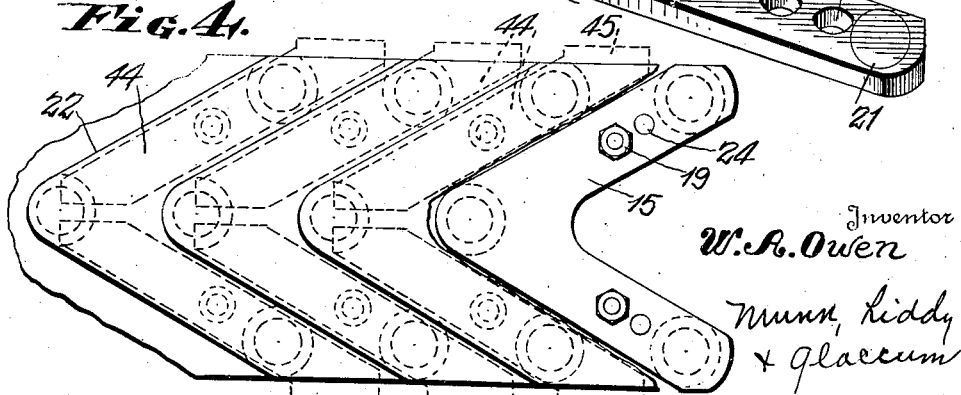

Aug. 10, 1943.  W. A. OWEN  2,326,488
RESILIENT TIRE FOR VEHICLES
Filed Jan. 6, 1943   2 Sheets-Sheet 2
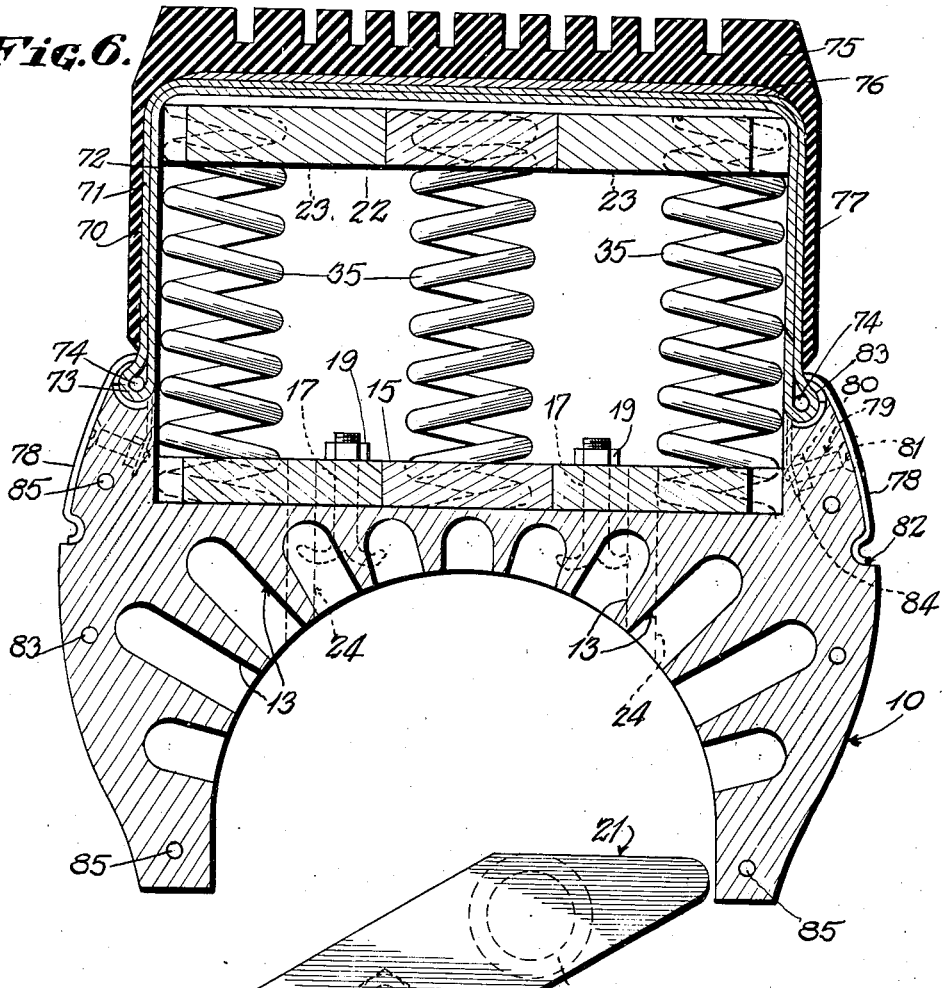
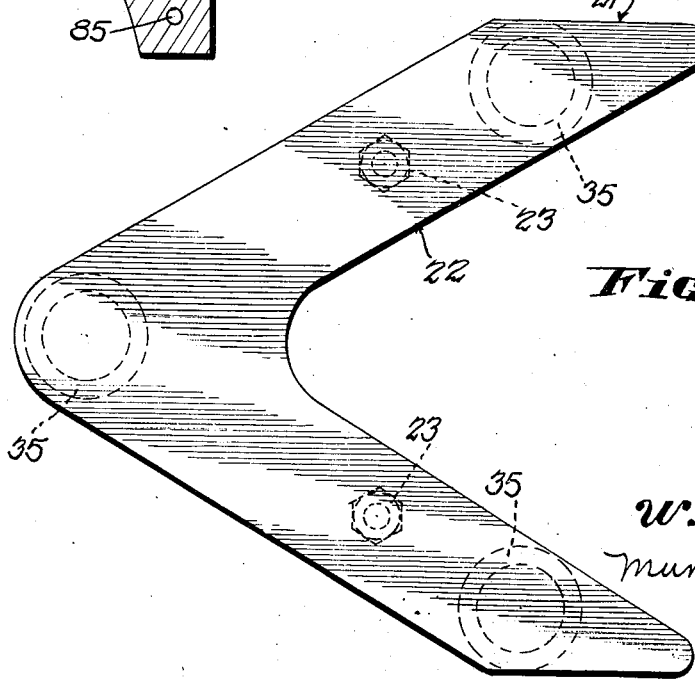
Inventor
W. A. Owen.
Munn, Liddy and
Glaecum
Attorneys Patented Aug. 10, 1943

2,326,488

UNITED STATES PATENT OFFICE 2,326,488

RESILIENT TIRE FOR VEHICLES

William A. Owen, Johnson City, Tenn.

Application January 6, 1943, Serial No. 471,489

12 Claims. (Cl. 152—297)

This invention relates to improvements in resilient wheels for all types of vehicles.

An object of the invention is the provision of a resilient wheel in which the usual wheel of a vehicle is employed and to the rim of said wheel is applied a demountable tire of a resilient type in which a plurality of segmental units are secured to the rim of the wheel, with each unit including a pair of spaced V-shaped members, connected together by coil springs, and with a covering housing the associated units, the tread portion of the tire being formed of rubber-impregnated fabric.

Another object of the invention is the provision of a mechanism as a substitute for the usual inflated tires of the present type in which a plurality of springs provide the resiliency, with the springs being imbedded at the opposite ends in spaced plastic members, a covering being employed not only preventing dust from collecting on the springs, but aiding in maintaining the springs against distortion, the tread portion of the tire being formed of rubber-impregnated fabric, with the usual grooved tread surface formed of rubber.

A further object of the invention is the provision of a tire which will operate as a substitute for the usual inflated rubber tires, and includes a circular base member upon which are mounted a plurality of radial disposed coil springs to create resiliency, said springs being firmly fixed or imbedded in V-shaped members, spaced from each other with means for securing the inner V-shaped members to the base portion, rings being connected to the base portion and extending upwardly along the sides of a cover housing the springs, and aiding in preventing distortion of the springs, the tread portion which is connected to the covering being formed of rubber-impregnated fabric, said tread portion being arranged in horizontal lines transversely of the tread portion, so that the tire will present a flat surface transversely of the road bed.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Fig. 1 is a side view of a resilient tire constructed according to the principles of my invention.

Fig. 2 is an enlarged fragmentary side view of a tire with a portion of the cover removed.

Fig. 3 is a transverse vertical section of the tire.

Fig. 4 is a fragmentary plan view of the tops of segmental units shown in operative relation.

Fig. 5 is a view in perspective of a part of V-shaped members, which form the inner and outer portions of a segmental unit of the tire.

Fig. 6 is a transverse vertical section of another form of the invention.

Fig. 7 is a plan view of a V-shaped member employed in the device shown in Fig. 6.

Referring more particularly to the drawings 10 generally designates a base member, which is circular and which is adapted to be mounted on the rim of a vehicle wheel. This base member is formed of any suitable material, particularly plastic, although this base member may be formed of wood or metal. Said base member has a semi-circular passage 11 disposed between the rim 12 of the wheel, and into the passage open pockets 13 which are provided for the particular purpose of decreasing the weight of the base member. This base member is provided with annular ribs 14 at each side of the outer periphery.

A plurality of V-shaped members generally designated by the numeral 15 are secured to the outer rim or periphery 16 of the base member 10. For this purpose bolts 17, having heads 18, imbedded in the base member 10, project above the upper surface of each member 15 with nuts 19 securing the V-shaped members to the rim 16. These V-shaped members are provided with openings 20 in the legs thereof through which the bolts 17 pass. While the V-shaped members are shown flat in Fig. 5, nevertheless these members are curved as shown in Fig. 2 in order to conform to the curvature of the periphery 16 of the base member 10.

The portions of the legs of the V-shaped members are sheared off as shown at 21 where they engage the inner sides of the ribs 14.

For each of the V-shaped members 15 which are secured to the base member 10 there is a corresponding V-shaped member 22, located outwardly and in radial alinement with V-shaped members 15 as shown in Fig. 2. Naturally, the members 22 are slightly longer, due to the fact that the circumference of the tire at the points where the V-shaped members 22 are located is greater than the circumference of the rim 16 of the base member 10. Each of the V-shaped members 22 are provided with spaced interiorly threaded cap nuts 23, which are radially alined with passage 24 in the V-shaped members 15 and with passage 25 in the base member 10. The cap nuts 23 are imbedded in the V-shaped members 22 and have their open ends opening into the interior of the tire.

A rod 30 is adapted to have one end threaded into the cap nuts 23, and this rod extends through the passages 25 and 24. The rod is provided with a shoulder 31, adapted to abut the inner periphery a wall of the passage 11 in the base member 10. This rod is provided with a head 32, which is adapted to be engaged by a suitable tool for turning the rod. The purpose of the rod is to cause the V-shaped members 22 to be drawn inwardly, and a rod is located in certain of the cap nuts 23, interspaced at the periphery of the tire so that all portions of the tread portion of the tire may be drawn inwardly for a purpose which will be presently explained. However, these rods do not remain in place during the normal running of the tire, but are only used when it is necessary to make repairs in the tire.

A plurality of coil springs 35 connect the V-shaped members 15 with the V-shaped members 22. The outer ends of the springs are imbedded in the material of the V-shaped members 22, while the inner ends of the springs are imbedded in the V-shaped members 15. In other words when the V-shaped members 15 and 22 are moulded the ends of the springs are set in the plastic material, so that the springs will be firmly fixed in position, and three springs connect one V-shaped member 15 with a V-shaped member 22, to form a segmental unit, which may be removed from the casing when worn by the removal of the nuts 19 from the bolts 17.

A piece of fabric is applied to each wall of the tire as shown in Fig. 3, and this fabric is folded upon itself to form a pair of contacting layers as shown at 36 and 37. The wire rim 38 is received by the fold 39 of the fabric. This fabric is applied to both sides of the tire with the free ends of the fabric being brought over the V-shaped members 22 with the extreme free ends being received by grooves 40 in the bight portion of the V-shaped members. A circular wedging member 41 is forced downwardly into the grooves 40 for holding the free ends 42 of the fabric in position.

Exteriorly of the fabric is placed a suitable tread portion which consists of rubber-impregnated fabric, as shown at 43, and on this is secured or cemented rubber cleats 44 which extend downwardly as shown at 45 of the side walls of the fabric 36. The cleats may be made of any material suitable for the purpose.

It will be seen by this construction that a cross section of the tire shows the tread in lines along horizontal planes entirely around the tire so that the tire will present a broad flat surface transversely of the same to the road bed, instead of the usual rounded or transversely curved type. Thus, all parts of the tread will be equally exposed to the road bed and provide an equal wearing surface at all times.

A ring 50, which also may be made of a plastic material, is secured to each side of the base member 10, by means of bolts 51, which are imbedded in the base member, and held securely against motion. These bolts project beyond a flat surface formed on the side walls of the base member and are received by openings in the rings 50. Nuts 53 secure the rings to the base member.

The outer surfaces of these rings are curved to conform to the curvature of the outer walls of the base member 10, as shown in Fig. 3, while a portion of the inner surface of each ring is flat as shown at 54 to conform to the flat surface 52 on base member 10. This ring is further modified at the inner wall to engage over the fabric 39 and the wire 38. These rings extend upwardly as shown at 55 and their inner flat surfaces engage the outer section 36 of the fabric covering. The portions 55 of the rings 50 aid in preventing lateral distortion of the springs 35, particularly when the vehicle is rounding a corner.

If it is desired to remove any of the units composed of the V-shaped members 15, 22, and springs 35, it is only necessary to insert a sufficient number of the rods 30 through the passages shown in Fig. 3, and when these rods are screwed sufficiently into the cap nuts 23 the V-shaped members 22 will be pulled in sufficiently against the tension of the springs 35 so that the cover formed by the strips of fabric 36 and 37 may be removed to remove an injured unit.

It will be noted that bolts 60 are threaded into nuts 61, which are imbedded in the fabric of the V-shaped members 22. These bolts are inserted through passages in the depending portions 45 of the cleats 44 for aiding in holding the rubber-impregnated fabric 43 in position on the tire.

The form shown in Figs. 6 and 7 is substantially the same as that shown in Figs. 1 to 5 inclusive, with certain exceptions, and these exceptions will be pointed out and new reference numbers will be employed for the different elements, but the same reference numerals will be employed in Figs. 6 and 7 which are used in Figs. 1 to 5 inclusive, for the elements which are common to all figures. In other words, the base member 10 is formed of any suitable material as has been explained, and this base member supports bolts 17, upon which are screwed nuts 19 for holding the V-shaped members 15. Each V-shaped member 15 is connected to the V-shaped member 22 by the springs 35 to form removable units of the tire.

It will be noted that the fabric covering, generally designated by the numeral 70, consists of two strips of material 71 and 72, which are folded at 73 to receive a wire ring 74. The strips of material extend over the top or outer face of the V-shaped members 22 and entirely house the springs and V-shaped members 22.

A tread portion which is formed of rubber as shown at 75 extends entirely around the tire and is connected to a strip of fabric 76, which in turn is connected to the periphery of the section 71 of the fabric 70. It will be noted that the rubber material 75 extends inwardly as shown at 77 along the outer face of the portion 71 of the fabric material 70.

A pair of rings 78 are connected to the outer portions of the side walls of the base member 10 by means of bolts 79 which are threaded into nuts 80 imbedded in the base member. The head portions 81 of the bolts are seated within countersunk portions of the rings 78. The inner peripheries of the rings 78 are seated within annular grooves 82 formed in the base member 10. The outer peripheries of the rings 78 as shown at 83 engage the outer section 71 of the fabric for aiding in maintaining the housing in position.

If desired the nuts 80 may be provided with integrally formed lips 84 which are imbedded in the material of the base member 10 to prevent turning of said nuts.

The rods shown at 30 in Fig. 3 are adapted to be employed in the device shown in Fig. 6 for the same purpose and therefore it will not be necessary to repeat this operation.

A tire constructed according to the present invention will give the necessary resiliency and will give long wear. On the other hand, it will be noted that the tread will actually contact the ground or road bed with a consequent even wear throughout the tire so that with the wear evenly distributed transversely in the tire there will be little wear on the tread per mile. Reinforcing wires 35 are imbedded in the material of the base member 10.

A great number of plastics are manufactured today by various corporations throughout the country which may be used to form the V-shaped members 15 and 22, and also the base member 10. One of these plastics is known under the trade name Styron, made by Dow Chemical Company, Midland, Michigan. Another plastic is made from cellulose by the Hercules Company, while still another plastic, known as Tenite, is made by the Tennessee Eastment Corporation of Kingsport, Tennessee.

Tenite is a thermoplastic molding material made from cellulose esters.

Another product which could be used for the elements noted above is the Wilmington Fibre made by Wilmington Fibre Company of Chicago, Illinois.

I claim:

1. A tire comprising a rim forming a base, a plurality of V-shaped members spaced around the periphery of the rim, a V-shaped member located outwardly of each of the first-named V-shaped member, coil springs connecting pairs of the first and second named members together, a fabric covering enclosing the springs and connected V-shaped member, means securing the inner peripheries of the covering to the side walls of the rim, means securing the first-named members to the rim, and a rubber-impregnated fabric cemented to the outer portion of the covering to form the tread.

2. A tire comprising a rim forming a base, a plurality of V-shaped members spaced around the periphery of the rim, a V-shaped member located outwardly of each of the first-named V-shaped member, coil springs connecting pairs of the first and second named members together, a fabric covering enclosing the springs and connected V-shaped member, means securing the inner peripheries of the covering to the side walls of the rim, means securing the first-named members to the rim, said rim having upstanding spaced ribs between which the first-named V-shaped members are disposed, and a rubber-impregnated fabric cemented to the outer portion of the covering to form the tread.

3. A tire comprising a rim forming a base, a plurality of V-shaped members spaced around the periphery of the rim, a V-shaped member located outwardly of each of the first-named V-shaped member, coil springs connecting pairs of the first and second-named members together, a fabric covering enclosing the springs and connected V-shaped member, means securing the inner peripheries of the covering to the side walls of the rim, means securing the first named members to the rim, said V-shaped members being curved to conform to the curvature of the rim, and a rubber impregnated fabric cemented to the outer portion of the covering to form the tread.

4. A tire comprising a rim to fit over the rim of a wheel and forming the base of the tire, a series of circumferentially arranged inner V-shaped members, a series of circumferentially arranged outer V-shaped members, each outer member being radially alined with a respective inner member; means for securing the inner series of V-shaped members to the rim, springs between each pair of the radially aligned inner and outer V-shaped members, an end of each spring being imbedded and securely fixed in the adjacently disposed V-shaped member, a covering housing the V-shaped members and springs and a rubber-impregnated fabric secured to the covering to form the tread of the tire.

5. A tire comprising a rim to fit over the rim of a wheel and forming the base of the tire, a series of circumferentially arranged inner V-shaped members, a series of circumferentially arranged outer V-shaped members, each outer member being radially alined with a respective inner member; means for securing the inner series of V-shaped members to the rim, springs between each pair of the radially aligned inner and outer V-shaped members, an end of each spring being imbedded and securely fixed in the adjacently disposed V-shaped member, a covering housing the V-shaped members and springs and a rubber-impregnated fabric secured to the covering to form the tread of the tire, the surface of the tread throughout its width being cylindrical, thereby presenting a broad surface to the road bed.

6. A tire comprising a rim to fit over the rim of a vehicle wheel and forming the base of the tire, a plurality of units mounted circumferentially on the rim, each unit consisting of a pair of V-shaped members, one of the members spaced outwardly from the other member, and springs connecting the members together, means securing the inner members to the outer periphery of the base, a flexible housing covering the V-shaped members and springs, means securing the housing to the base, and a rubber-impregnated fabric forming the tread portion of the tire.

7. A tire comprising a rim to fit over the rim of a vehicle wheel and forming the base of the tire, a plurality of units mounted circumferentially on the rim, each unit consisting of a pair of V-shaped members, one of the members spaced outwardly from the other member, and coil springs having the ends thereof securely imbedded in the adjacently disposed V-shaped member for connecting the members together, means securing the inner members to the outer periphery of the base, a flexible housing covering the V-shaped members and springs, means securing the housing to the base, and a rubber-impregnated fabric forming the tread portion of the tire.

8. A tire comprising a rim to fit over the rim of a vehicle wheel and forming the base of the tire, a plurality of units mounted circumferentially on the rim, each unit consisting of a pair of V-shaped members, one of the members spaced outwardly from the other member, said V-shaped members being formed of molded and hardened plastic material, and coil springs having their ends set in the plastic materials of the adjacently disposed V-shaped members so that when the plastic has become hard the springs will be firmly secured and connect the members together, means securing the inner members to the outer periphery of the base, a flexible housing covering the V-shaped members and springs, means securing the housing to the base, and a rubber-impregnated fabric forming the tread portion of the tire.

9. A tire comprising a rim to fit over the rim of a vehicle wheel and forming the base of the tire, a plurality of units mounted circumferentially on the rim, each unit consisting of a pair of V-shaped members, one of the members spaced outwardly from the other member, and springs connecting the members together, means securing the inner members to the outer periphery of the base, a flexible housing covering the V-shaped members and springs, means securing the housing to the base, and a rubber-impregnated fabric forming the tread portion of the tire, the outer V-shaped members being provided with nuts, the inner V-shaped members and base having alined passages to receive a threaded tool which is inserted through the alined passages and screwed into the nut for drawing an outer V-shaped member towards an associated inner member against the tension of the connecting springs.

10. A tire comprising a rim to fit over the rim of a vehicle wheel and forming the base of the tire, a plurality of units mounted circumferentially on the rim, each unit consisting of a pair of V-shaped members, one of the members spaced outwardly from the other member, and springs connecting the members together, means securing the inner members to the outer periphery of the base, a piece of fabric folded upon itself to form a circumferential housing with side walls and an outer circular wall resting on the outer V-shaped member for completely enclosing the assembled units, means securing the side walls to the base, and a rubber-impregnated fabric forming the tread portion of the tire.

11. A tire comprising a rim to fit over the rim of a vehicle wheel and forming the base of the tire, a plurality of units mounted circumferentially on the rim, each unit consisting of a pair of V-shaped members, one of the members spaced outwardly from the other member, and springs connecting the members together, means securing the inner members to the outer periphery of the base, a folded fabric forming a circumferential housing for completely enclosing the assembled units, the outside walls of the base having annular grooves, said housing including side walls having portions located in the grooves, rings having ribs complemental to the grooves and fitted therein, means attaching the rings to the walls of the base for not only securing the side walls of the housing to the base but for supporting said side walls and the springs against lateral distortion beyond the outer periphery of the base, and a rubber-impregnated fabric forming the tread portion of the tire.

12. A tire comprising a rim to fit over the rim of a vehicle wheel and forming the base of the tire, a plurality of units mounted circumferentially on the rim, each unit consisting of a pair of V-shaped members, one of the members spaced outwardly from the other member, and springs connecting the members together, means securing the inner members to the outer periphery of the base, a folded fabric at each side of the assembled units with the free ends of the fabric extending over the outer V-shaped members and terminating at the circumferential center of the tread portion of the tire, means for retaining the ends against movement, means for attaching the fabric to the sides of the base, said fabric completely housing the assembled units and aiding in retaining the units in proper position, and a rubber-impregnated fabric forming the tread portion of the tire.

WILLIAM A. OWEN.